United States Patent
Davies

(10) Patent No.: US 10,458,530 B2
(45) Date of Patent: Oct. 29, 2019

(54) HYBRID BALLSCREW SEAL

(71) Applicant: Goodrich Actuation Systems Limited, Solihull, West Midlands (GB)

(72) Inventor: Stephen Davies, Shrewsbury (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 15/956,840

(22) Filed: Apr. 19, 2018

(65) Prior Publication Data
US 2018/0306287 A1   Oct. 25, 2018

(30) Foreign Application Priority Data

Apr. 21, 2017  (EP) ..................................... 17275056

(51) Int. Cl.
| | | |
|---|---|---|
| *F16H 1/24* | (2006.01) | |
| *F16H 55/02* | (2006.01) | |
| *F16H 25/24* | (2006.01) | |
| *F16J 15/3284* | (2016.01) | |
| *F16H 25/22* | (2006.01) | |
| *F16J 15/32* | (2016.01) | |

(52) U.S. Cl.
CPC ..... *F16H 25/2418* (2013.01); *F16H 25/2204* (2013.01); *F16J 15/32* (2013.01); *F16J 15/3284* (2013.01)

(58) Field of Classification Search
CPC ..... F16H 25/2418; F16J 15/32; F16J 15/3284
See application file for complete search history.

(56) References Cited

U.S. PATENT DOCUMENTS

| | | | | |
|---|---|---|---|---|
| 3,669,460 | A | * | 6/1972 | Wysong .............. F16H 25/2418 277/354 |
| 3,678,776 | A | | 7/1972 | Patterson |
| 4,052,076 | A | * | 10/1977 | Wysong .............. F16H 25/2418 277/354 |
| 4,159,118 | A | | 6/1979 | Jelinek et al. |
| 4,175,475 | A | | 11/1979 | Eckhardt |
| 4,905,533 | A | | 3/1990 | Benton et al. |

(Continued)

FOREIGN PATENT DOCUMENTS

| | | |
|---|---|---|
| GB | 2218757 A | 11/1989 |
| WO | 199003530 A1 | 4/1990 |

OTHER PUBLICATIONS

Extended European Search Report for International Application No. 17275056.4 dated Oct. 18, 2017, 8 pages.

*Primary Examiner* — Jake Cook
(74) *Attorney, Agent, or Firm* — Cantor Colburn LLP

(57) ABSTRACT

A seal assembly for a ballscrew comprises a seal body. The seal body comprises a helical body portion having a central axis and extending through substantially a single helical turn about the central axis from a first end to a second end axially spaced from the first end. A connecting portion extends generally parallel to the central axis (A) and connects the first and second ends of the helical body portion. A channel is formed in a radially outer surface of the seal body, the channel extending continuously around the helical body portion and the connecting portion. An arcuate scraper seal portion extends inwardly from a radially inner surface of the connecting portion for sealing engagement within a helical groove of the ballscrew.

13 Claims, 5 Drawing Sheets

(56) References Cited

U.S. PATENT DOCUMENTS

| | | | | |
|---|---|---|---|---|
| 5,029,877 A | * | 7/1991 | Fedeli | F16H 25/2418 |
| | | | | 277/354 |
| 5,324,047 A | * | 6/1994 | Organ | F16H 25/2418 |
| | | | | 277/354 |
| 7,430,933 B2 | | 10/2008 | Yatsushiro et al. | |
| 9,388,890 B2 | | 7/2016 | Garrett et al. | |
| 2005/0087029 A1 | * | 4/2005 | Perni | F16H 25/2418 |
| | | | | 74/89.4 |
| 2013/0255419 A1 | * | 10/2013 | Iida | F16H 25/2418 |
| | | | | 74/424.81 |

* cited by examiner

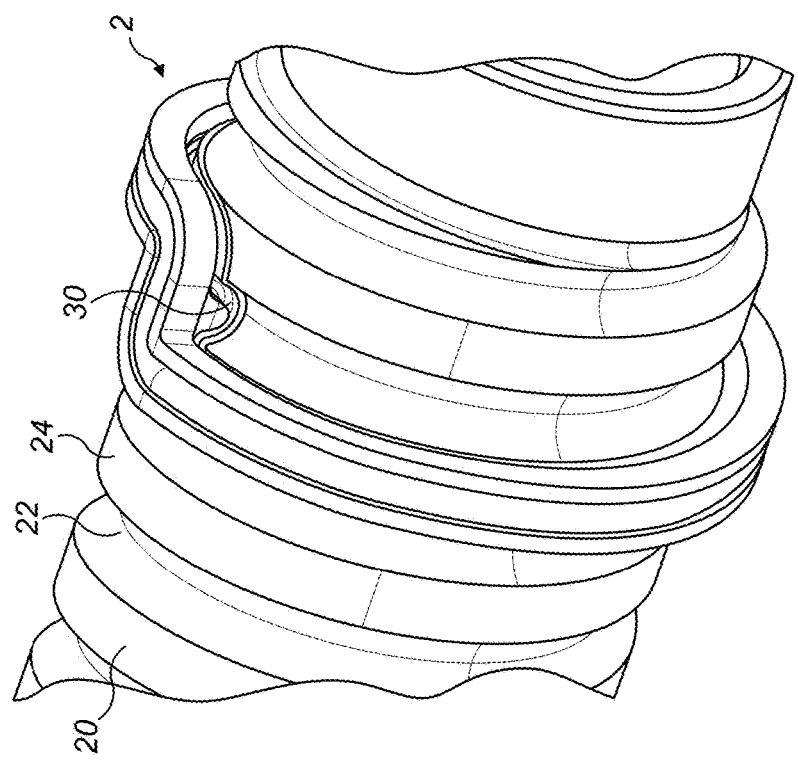
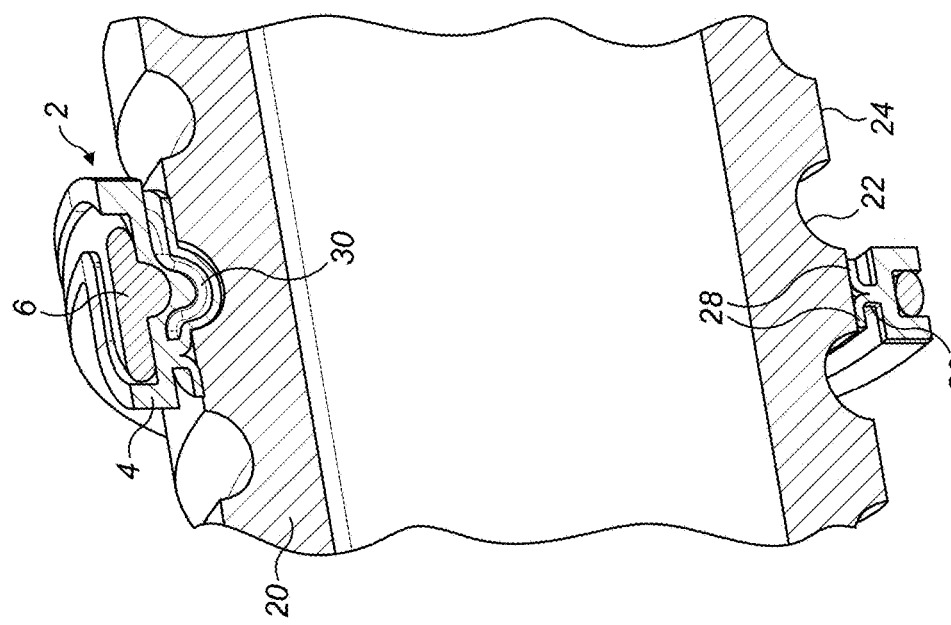

HYBRID BALLSCREW SEAL

FOREIGN PRIORITY

This application claims priority to European Patent Application No. 17275056.4 filed Apr. 21, 2017, the entire contents of which is incorporated herein by reference.

TECHNICAL FIELD

The present disclosure relates to ball screw actuators, and in particular to seals for ball screw actuators.

BACKGROUND

It is known to use ball screw actuators to translate a rotational displacement into an axial displacement while minimising frictional losses. Ballscrew actuators are used in a variety of applications, including in aircraft and aircraft engines.

Ball screw actuators are generally lubricated in order to facilitate relative motion between the screw, nut and balls. It is desirable to seal the ballscrew actuator in such a way as to prevent the lubricant leaking, thereby to maximise the period between reapplications of the lubricant.

In addition, ballscrew actuators are often operated in adverse environmental conditions. External moisture or debris which enters the ballscrew assembly reduces the effectiveness of the actuator, and it is therefore also desirable to seal the assembly to prevent ingress of environmental elements.

SUMMARY

According to one embodiment of the present disclosure, there is provided a seal assembly for a ballscrew, the seal assembly comprising a seal body and an energising member. The seal body comprises a helical body portion having a central axis and extending through substantially a single helical turn about said central axis from a first end to a second end axially spaced from the first end. The seal body further comprises a connecting portion extending generally parallel to the central axis and connecting the first and second ends of the helical body portion. The seal body further comprises a channel formed in a radially outer surface of the seal body, the channel extending continuously around the helical body portion and the connecting portion. The seal body further comprises an arcuate scraper seal portion extending inwardly from a radially inner surface of the connecting portion for sealing engagement within a helical groove of said ballscrew. The seal body further comprises a helical sealing portion extending from a radially inner surface of the helical body portion, and extending circumferentially around the helical body portion from the first end to the second end for engaging a radially outer helical ridge of said ballscrew, the scraper seal portion and helical sealing portion forming a continuous seal around the inner diameter of the seal body. The energising member is disposed within the channel for radially inwardly pre-loading said scraper seal portion and said helical seal portion.

The helical sealing portion and/or the scraper seal portion may comprise a radially inwardly extending rib.

The helical sealing portion may comprise a lip seal with a deformable beam section extending radially inwardly of the seal body. The lip seal may further comprise two deformable beam sections to provide two sealing lips. The deformable beam sections may diverge from each other in opposite axial directions.

The scraper seal portion may comprise an arcuate lip. The scraper seal portion may further comprise a pair of circumferentially spaced arcuate lips. The arcuate lips may be formed continuously with the sealing lips of the helical sealing portion.

The scraper portion may include a cavity which opens into the connecting channel of the connecting portion, wherein the energising member includes a portion which projects radially inwardly into the cavity.

The energising member may be formed, for example moulded, from an elastomeric material.

The energising member may project radially outwardly from the channel formed in the radially outer surface of the seal body.

The seal body may be a unitary structure, for example a one-piece moulding.

According to another embodiment of the present disclosure, there is provided a ballscrew assembly comprising a ballnut and a ballscrew arranged within the ballnut. The ballscrew has a helical groove and a radially outer helical ridge. The ballscrew assembly further comprises a seal assembly in accordance with the disclosure, the seal assembly mounted to the ballnut. The scraper portion sealingly engages the helical groove, and the helical sealing portion (26) sealingly engages the helical ridge (24) to form a circumferentially continuous seal.

According to another embodiment of the present disclosure, there is provided a method of manufacturing the seal assembly or ballscrew assembly in accordance with the present disclosure. The method comprises molding the seal body as a single plastic piece, molding the energising element from an elastomeric material, and mounting the energising member within the channel of the seal body such that the energising member is tensioned, and applies a radially inward preloading force to the seal body.

BRIEF DESCRIPTION OF THE DRAWINGS

An embodiment of the present disclosure will now be described by way of example only, and with reference to the following drawings in which:

FIG. 4 shows a cross-sectional view of a ballscrew with the seal of FIG. 1.

FIG. 5 shows a perspective view of the ballscrew and seal of FIG. 4.

DETAILED DESCRIPTION

A typical ballscrew assembly comprises a ballnut, a ballscrew and a plurality of balls. The ballnut includes a helical groove formed on a radially inner surface, and the ballscrew includes a corresponding helical groove formed on a radially outer surface. The ballscrew is disposed within the ballnut, and the balls sit between the ballscrew and the ballnut, within the helical grooves. The ballscrew can rotate within the ballnut, which causes the ballscrew to move along a shared axis of the ballnut and ballscrew.

The ballscrew and ballnut are typically lubricated to facilitate this movement. The ballscrew assembly may use an oil lubricant, or a grease lubricant. Seals are typically provided at the ends of the ballnut to prevent this lubricant from leaking. An additional function of such a seal is to prevent moisture from entering the ballscrew assembly.

Figure 1:
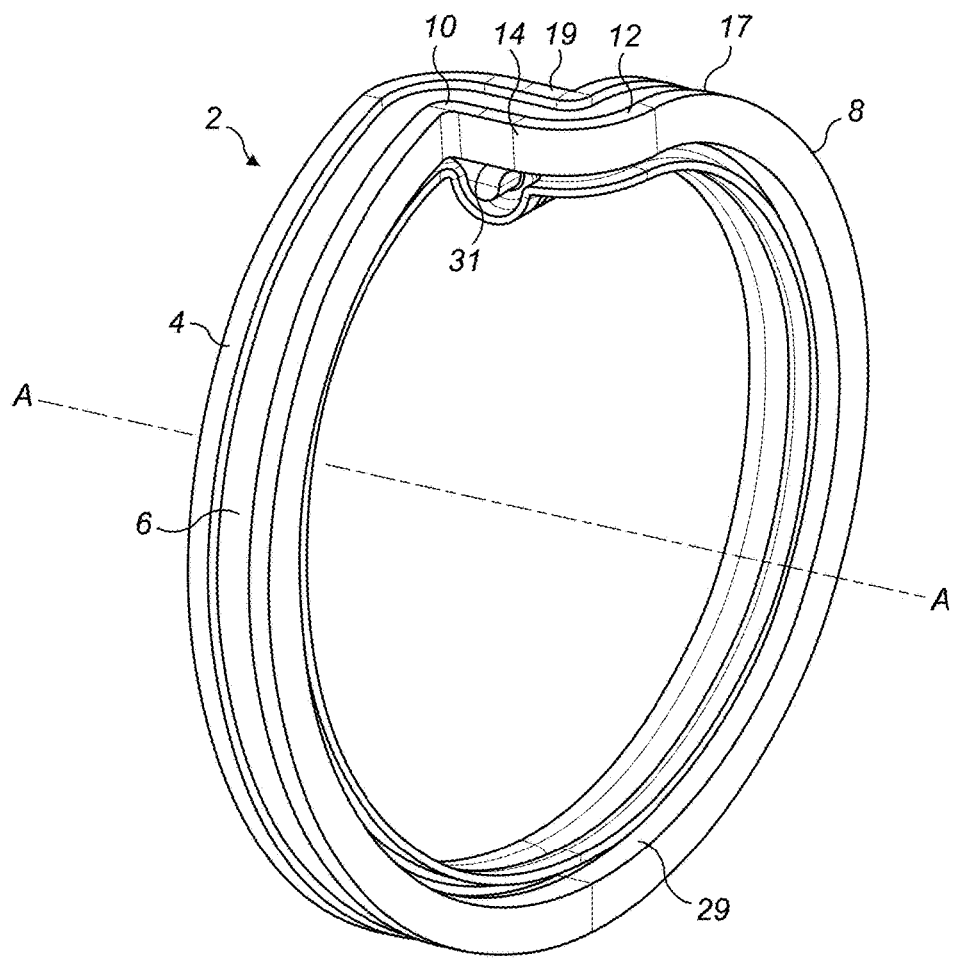
FIG. 1 shows a perspective view of a ballscrew actuator seal assembly in accordance with this disclosure.
Figure 3:
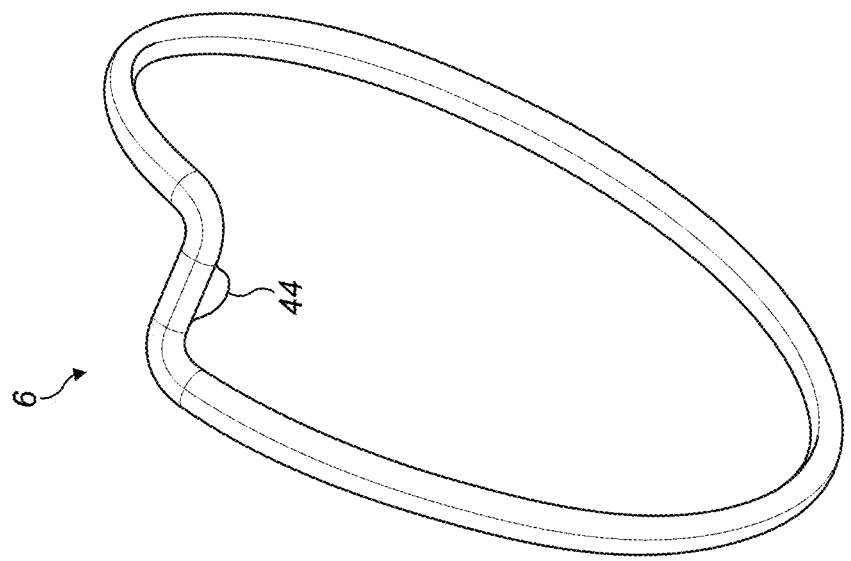
FIG. 3 shows a view of an energising member of the seal of FIG. 1.
Figure 2:
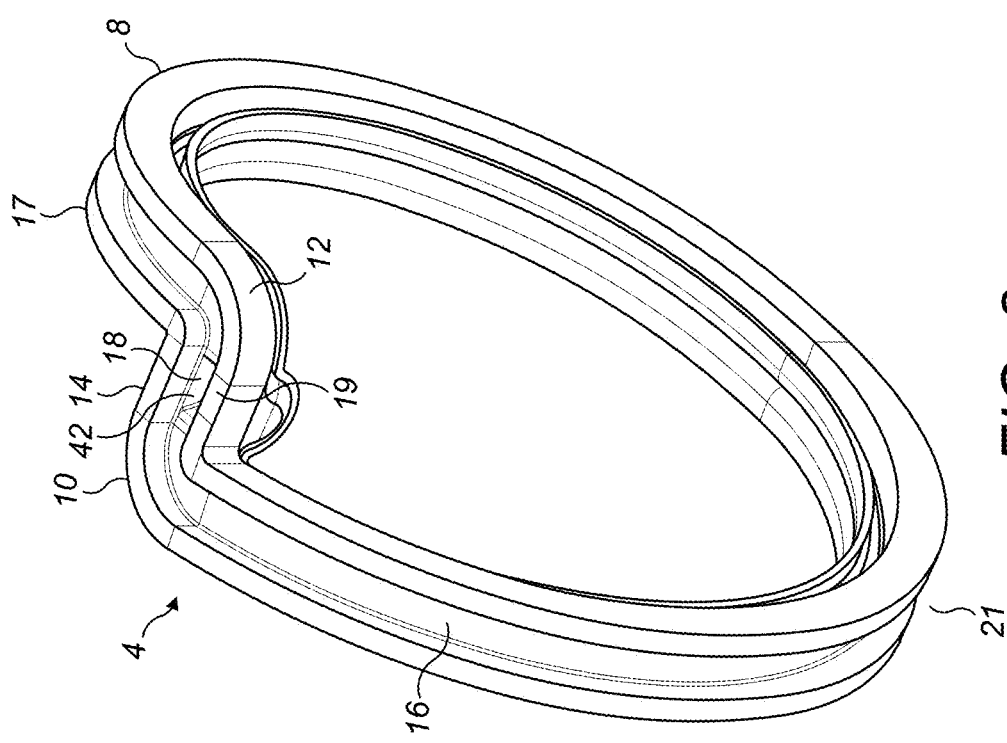
FIG. 2 shows a view of a seal body of the seal of FIG. 1.

With reference to FIG. 1, a seal assembly 2 for a ballscrew is illustrated. The seal assembly 2 comprises a seal body 4 and an energising member 6. FIG. 2 illustrates the seal body 4 in isolation, and FIG. 3 illustrates the energising member 6 in isolation.

The seal body 4 has a main helical body portion 8, which extends through a single helical turn around a central axis A of the seal body 4. The helical body portion 8 extends from a first end 10 to a second end 12 axially spaced from the first end 10. The first end 10 and the second end 12 are joined by a connecting portion 14 of the seal body 4, which is arranged generally parallel to the central axis A.

The helical body portion 8 includes a helical channel 16 on a radially outer surface 17. The helical channel 16 extends around the entire circumference from the first end 10 to the second end 12. The connecting portion 14 includes a connecting channel 18 on a radially outer surface 19 which is contiguous with the radially outer surface 17 of the helical body portion 8. The connecting channel 18 joins the ends of the helical channel 16 to form a continuous channel 21 around the exterior of the entire seal body 4.

The seal body 4 may be formed as a unitary, single piece structure. In embodiments, the seal body may be made from a deformable plastics material such as polytetrafluoroethylene (PTFE) or PTFE based materials. The seal body 4 may therefore be made by moulding in various embodiments.

The energising member 6 has a shape which corresponds to that of the continuous channel formed in the seal body 4, such that the energising member can fit within the channel. In one embodiment, the energising member 6 is formed from a different material from the seal body 4. In embodiments, the energising member may be made from an elastomeric material, for example an elastomeric material such as ethylene propylene rubber or fluorosilicone.

The energising member 6 fits into the seal body 4 in a tensioned state. This can be achieved by using an energising member 6 which has a circumference less than that of the seal body. The energising member 6 contracts within the channel 21 of the seal body 4, and thereby applies a preloading force radially inwardly.

FIG. 5. shows a perspective view of a seal assembly 2, as described above, fitted around a ballscrew 20. FIG. 4 shows the same seal assembly 2 and ballscrew 20 in radial cross-section. The ballscrew 20 has a helical groove 22 which forms a corresponding ridge 24. As can be seen in FIG. 5, the helical body portion 8 generally fits around the ridge 24, while the connecting portion 10 axially bridges the groove 22. The seal assembly 2 will be received and axially located within a bore of a ballnut (not shown)

The helical body portion 8 comprises a helical sealing portion 26 to sealingly interface with the ridge 24. In the embodiment illustrated, the helical sealing portion 26 is a lip seal 26. The lip seal has a deformable beam section forming the lip. The lip seal 26 may have two diverging lips 28, formed by respective deformable beam sections. The lip seal 26 extends radially inwardly from a radially inner surface 29 of the helical body 8 to sealingly engage with the ballscrew 20 along a turn of the ridge 24. The lip seal 26 extends around the entire circumference of the helical body portion 8, from the first end 10 to the second end 12.

The lip seal 26 forms a line seal (in fact two line seals—one with each lip 28) with the ridge 24. That is, the seal interface formed between the lip seal 26 and the ridge 24 is a circumferential line shape. Such a line contact has a superior sealing effect to that of a surface contact. The lip seal 26 is urged into contact with the ridge 24 by the preloading force of the energising member 6. This force, and the contact made, causes the lip seal 26 to deflect.

The connecting portion 14 includes a scraper seal 30. The scraper seal 30 extends radially inwardly from a radially inner surface 31 of the connecting portion 14. The scraper seal is generally complementary in shape to the ballscrew groove 22 so as to engage over its entire cross section. In one embodiment, the scraper seal 30 comprises an arcuate lip 33 which corresponds to the shape of the groove 24 of the ballscrew 20. The scraper seal is preloaded by the same mechanism as the lip seal 26. In other embodiments, and as illustrated, the scraper seal 30 may comprise two arcuate lips 33 which are circumferentially spaced, and may provide line contact with the groove 22, such as that described in relation to the lip seal 26 and the ridge 24. The scraper seal 30 forms a sealing interface with the surface of the groove 22.

The scraper seal 30 connects with the lip seal 26 at the first end 10 and the second end 12 of the helical body portion 8, thereby providing a continuous sealing edge or edges around the seal body 4 and thus a continuous sealing interface between the seal assembly 2 and the ballscrew 20.

The scraper portion 30 includes a cavity 42 which opens into the channel 18 of the connecting portion 14. The energising member 6 includes a projecting portion 44 which extends into the cavity 42. This may assist in locating the energising member 6 in the seal body 4.

Figure 6A:
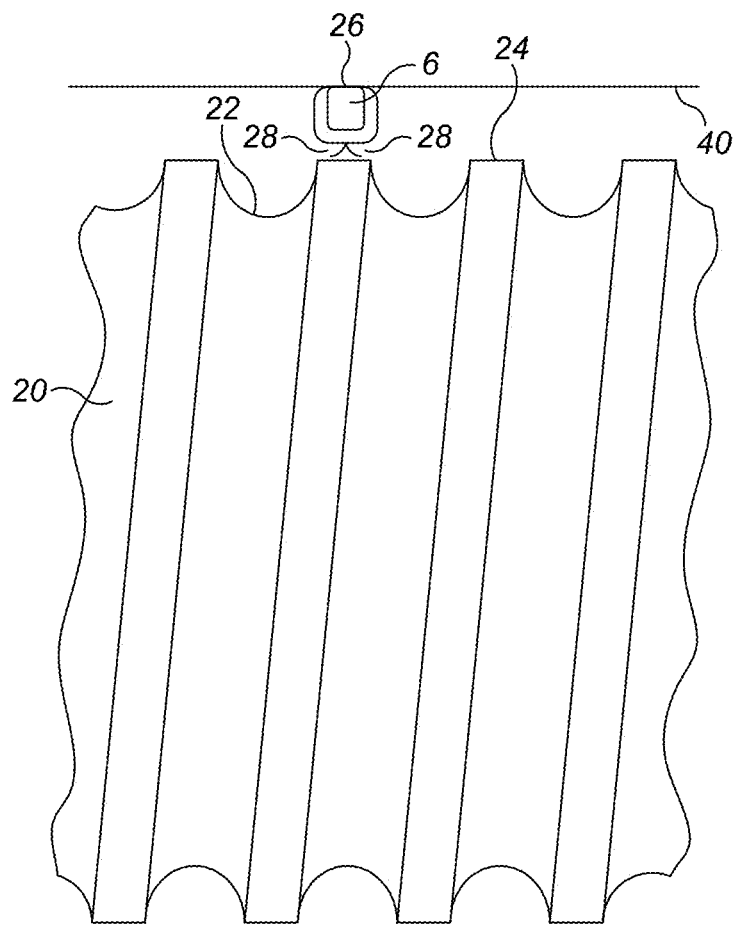
FIGS. 6a, 6b and 6c show schematic cross-sectional views of an embodiment of a ballscrew and seal.
Figure 6B:
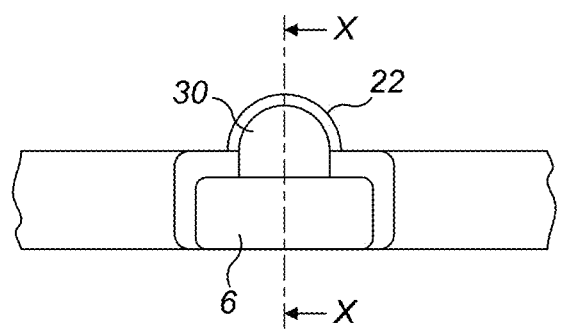
Figure 6C:
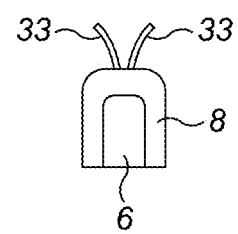

FIGS. 6a to 6c show cross-sectional views of an embodiment of seal assembly 2 and ballscrew 20, the seal assembly being generally similar to that of FIG. 4. FIG. 6a is an axial cross section through the helical body portion 8, FIG. 6b an axial cross section through the connecting portion 14 and FIG. 6c a section along line X-X of FIG. 6b.

These figures illustrate schematically the features of the lip seal 26, and the two diverging lips 28 thereof and the scraper seal and two lips 33 thereof. It also shows that the energising member 6 may project slightly from the channel 21 in the seal body 4 so as to provide a sealing engagement with an internal surface 40 of a ballnut.

Figure 7A:
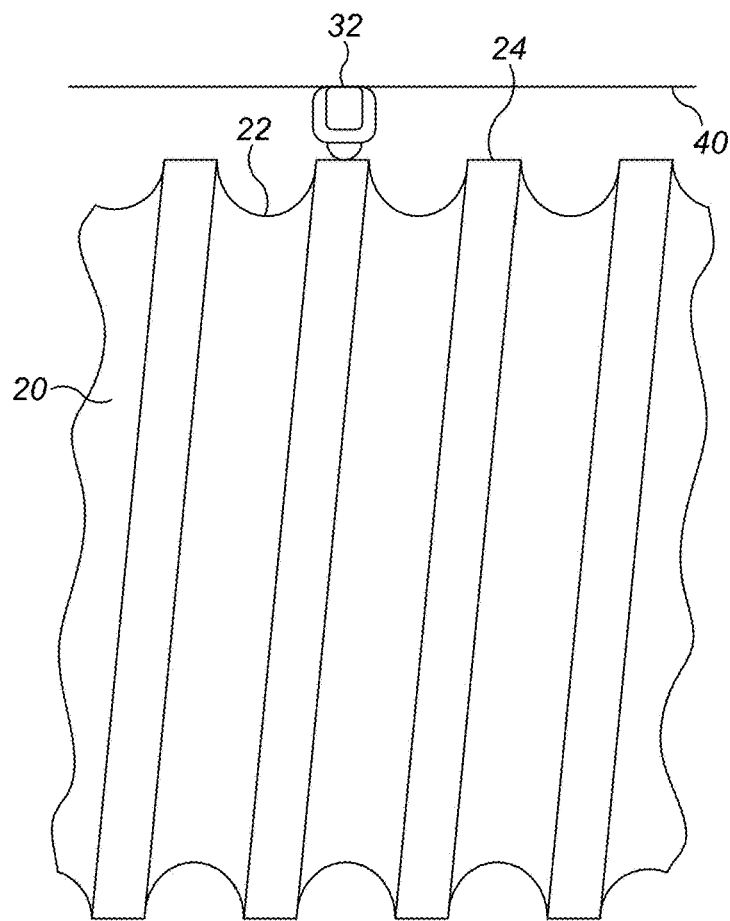
FIGS. 7a, 7b and 7c show schematic cross-sectional views of an alternative embodiment of a ballscrew and seal.
Figure 7B:
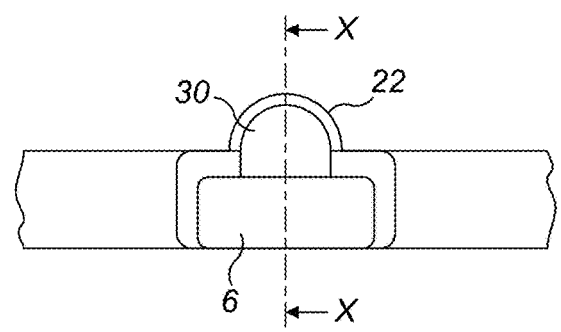
Figure 7C:
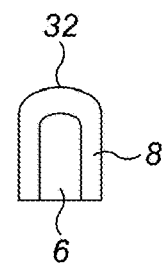

FIGS. 7a to 7c shows cross-sectional views, corresponding to FIGS. 6a to 6c, of an alternative seal assembly 2 and ballscrew 20 which comprise rib seals 32 in place of the lip seals 26 of the helical body portion 8 and the scraper seal 30. The rib seal 32 may provide a single, wider contact area with the groove 22 and ridge 24 in order to provide a sealing interface.

As will be appreciated from, the Figures, the seal assembly 2 will form a complete circumferential seal between the ballnut and ballscrew. The seal assembly 2 may prevent or significantly reduce the egress of lubricant from the ballnut in one direction across the seal assembly and prevent or significantly reduce the ingress of external contaminants into the ballnut in the other direction.

The seal assembly 2 forms a helical shape, rather than a toroidal shape. This means the seal assembly 2 has a generally consistent shape throughout a full helical turn of the ballscrew. This shape provides a consistent and uniform preloading force on the sealing portions, and thereby provides an effective seal.

The invention claimed is:

1. A seal assembly for a ballscrew comprising:
a seal body, the seal body comprising:
   a helical body portion having a central axis (A) and extending through substantially a single helical turn about said central axis (A) from a first end to a second end axially spaced from the first end;
   a connecting portion extending generally parallel to the central axis (A) and connecting the first and second ends of the helical body portion;
   a channel formed in a radially outer surface of the seal body, the channel extending continuously around the helical body portion and the connecting portion;
   an arcuate scraper seal portion extending inwardly from a radially inner surface of the connecting portion for sealing engagement within a helical groove of said ballscrew; and
   a helical sealing portion extending from a radially inner surface of the helical body portion, and extending circumferentially around the helical body portion from the first end to the second end for engaging a radially outer helical ridge of said ballscrew, the scraper seal portion and helical sealing portion forming a continuous seal around the inner diameter of the seal body; and
an energising member disposed within the channel for radially inwardly pre-loading said scraper seal portion and said helical seal portion;
wherein the helical sealing portion comprises a lip seal with at least one deformable beam section extending radially inwardly of the seal body.

2. The seal assembly of claim 1, wherein the helical sealing portion and/or the scraper seal portion comprises a radially inwardly extending rib.

3. The seal assembly of claim 1, wherein the at least one deformable beam section comprises two deformable beam sections to provide two sealing lips.

4. The seal assembly of claim 3, wherein the deformable beam sections diverge from each other in opposite axial directions.

5. The seal assembly of claim 1, wherein the scraper seal portion comprises at least one arcuate lip.

6. The seal assembly of claim 5, wherein the scraper seal portion comprises a pair of circumferentially spaced arcuate lips.

7. The seal assembly of claim 6, wherein the arcuate lips are formed continuously with the sealing lips of the helical sealing portion.

8. The seal assembly of claim 1, wherein the scraper portion includes a cavity which opens into a connecting channel of the connecting portion, and wherein the energising member includes a portion which projects radially inwardly into the cavity.

9. The seal assembly of claim 1, wherein the energising member is formed from an elastomeric material.

10. The seal assembly of claim 9, wherein the energising member projects radially outwardly from the channel formed in the radially outer surface of the seal body.

11. The seal assembly of claim 1, wherein the seal body is a unitary structure.

12. A ballscrew assembly comprising:
a ballnut;
a ballscrew arranged within the ballnut, the ballscrew having a helical groove and a radially outer helical ridge; and
a seal assembly mounted to the ballnut,
wherein the seal assembly includes a seal body, the seal body comprising:
   a helical body portion having a central axis (A) and extending through substantially a single helical turn about said central axis (A) from a first end to a second end axially spaced from the first end;
   a connecting portion extending generally parallel to the central axis (A) and connecting the first and second ends of the helical body portion;
   a channel formed in a radially outer surface of the seal body, the channel extending continuously around the helical body portion and the connecting portion;
   an arcuate scraper seal portion extending inwardly from a radially inner surface of the connecting portion for sealing engagement within a helical groove of said ballscrew; and
   a helical sealing portion extending from a radially inner surface of the helical body portion, and extending circumferentially around the helical body portion from the first end to the second end for engaging a radially outer helical ridge of said ballscrew, the scraper seal portion and helical sealing portion forming a continuous seal around the inner diameter of the seal body; and
an energising member disposed within the channel for radially inwardly pre-loading said scraper seal portion and said helical seal portion;
wherein the helical sealing portion comprises a lip seal with at least one deformable beam section extending radially inwardly of the seal body;
wherein the scraper portion sealingly engages the helical groove, and the helical sealing portion sealingly engages the helical ridge to form a circumferentially continuous seal.

13. A method of manufacturing the seal assembly of claim 1, the method comprising:
molding the seal body as a single plastic piece;
molding the energising element from an elastomeric material; and
mounting the energising member within the channel of the seal body such that the energising member is tensioned, and applies a radially inward preloading force to the seal body.

* * * * *